(12) United States Patent
Hodge

(10) Patent No.: US 10,749,827 B2
(45) Date of Patent: Aug. 18, 2020

(54) SYSTEM AND METHOD FOR INMATE NOTIFICATION AND TRAINING IN A CONTROLLED ENVIRONMENT FACILITY

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 96 days.

(21) Appl. No.: 15/592,944

(22) Filed: May 11, 2017

(65) Prior Publication Data

US 2018/0331987 A1 Nov. 15, 2018

(51) Int. Cl.
*H04L 12/58* (2006.01)
*H04L 29/08* (2006.01)
(Continued)

(52) U.S. Cl.
CPC .............. *H04L 51/12* (2013.01); *G06Q 50/26* (2013.01); *H04L 51/066* (2013.01); *H04L 51/14* (2013.01);
(Continued)

(58) Field of Classification Search
CPC ....... G06Q 50/26; H04L 51/066; H04L 51/12; H04L 63/102; H04L 63/083; H04L 63/0861
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 0989720 A1 3/2000
GB 2400284 A 10/2004
(Continued)

OTHER PUBLICATIONS

Definition of "circuit switching", Newton's Telecom Dictionary, 10th Edition, 1996.
(Continued)

*Primary Examiner* — Todd L Barker
(74) *Attorney, Agent, or Firm* — Sterne, Kessler, Goldstein & Fox P.L.L.C.

(57) ABSTRACT

A messaging system for relaying messages to groups of inmates located in one or more controlled-environment facilities. The system receives a message from a user and a recipient designation identifying those inmates designated for receiving the message. The system performs a content check of the message or requests administrator authorization of the message, and then packages the message in a format designated by the facility. The packaged message includes the message itself, and also recipient information and other delivery information. The message may be packaged uniquely according to facility specifications. At the facility, the received message is unpacked. Recipients are identified from the recipient designation in the message, and delivery methods are retrieved for each of the intended recipients. Delivery of the message is then carried out, at a time designated in the message, according to the retrieved delivery methods.

20 Claims, 6 Drawing Sheets

(51) Int. Cl.
*G06Q 50/26* (2012.01)
*H04L 29/06* (2006.01)
(52) U.S. Cl.
CPC ............ *H04L 63/102* (2013.01); *H04L 67/12*
(2013.01); *H04L 63/083* (2013.01); *H04L*
*63/0861* (2013.01)

(56) References Cited

U.S. PATENT DOCUMENTS

| | | | |
|---|---|---|---|
| 4,652,700 A | 3/1987 | Matthews et al. | |
| 4,766,604 A | 8/1988 | Axberg | |
| 4,935,956 A | 6/1990 | Hellwarth et al. | |
| 5,068,888 A | 11/1991 | Scherk et al. | |
| 5,319,702 A | 6/1994 | Kitchin et al. | |
| 5,351,287 A | 9/1994 | Bhattacharyya et al. | |
| 5,535,261 A | 7/1996 | Brown et al. | |
| 5,539,812 A | 7/1996 | Kitchin et al. | |
| 5,553,145 A | 9/1996 | Micali | |
| 5,648,916 A | 7/1997 | Manduley | |
| 5,655,013 A | 8/1997 | Gainsboro | |
| 5,705,995 A | 1/1998 | Lafflin et al. | |
| 5,740,231 A | 4/1998 | Cohn et al. | |
| 5,745,558 A | 4/1998 | Richardson, Jr. et al. | |
| 5,768,355 A | 6/1998 | Salibrici et al. | |
| 5,778,313 A | 7/1998 | Fougnies | |
| 5,805,810 A | 9/1998 | Maxwell | |
| 5,826,034 A | 10/1998 | Albal | |
| 5,838,790 A | 11/1998 | McAuliffe et al. | |
| 5,848,397 A | 12/1998 | Marsh et al. | |
| 5,854,975 A | 12/1998 | Fougnies et al. | |
| 5,872,926 A | 2/1999 | Levac et al. | |
| 5,894,558 A | 4/1999 | Falker | |
| 5,937,037 A | 8/1999 | Kamel et al. | |
| 5,956,717 A | 9/1999 | Kraay et al. | |
| 5,958,005 A | 9/1999 | Thorne et al. | |
| 5,982,506 A | 11/1999 | Kara | |
| 5,987,611 A | 11/1999 | Freund | |
| 6,002,689 A | 12/1999 | Christie | |
| 6,035,327 A * | 3/2000 | Buckley | H04L 51/00 709/206 |
| 6,052,454 A | 4/2000 | Kek et al. | |
| 6,061,718 A | 5/2000 | Nelson | |
| 6,064,963 A | 5/2000 | Gainsboro | |
| 6,067,514 A | 5/2000 | Chen | |
| 6,097,791 A | 8/2000 | Ladd et al. | |
| 6,137,864 A | 10/2000 | Yaker | |
| 6,145,004 A | 11/2000 | Walsh | |
| 6,151,679 A | 11/2000 | Friedman et al. | |
| 6,161,139 A | 12/2000 | Win et al. | |
| 6,173,259 B1 | 1/2001 | Bijl et al. | |
| 6,173,284 B1 | 1/2001 | Brown | |
| 6,192,114 B1 | 2/2001 | Council | |
| 6,226,362 B1 | 5/2001 | Gerszberg et al. | |
| 6,226,363 B1 | 5/2001 | Miller | |
| 6,233,313 B1 | 5/2001 | Farris et al. | |
| 6,233,318 B1 | 5/2001 | Picard et al. | |
| 6,246,871 B1 | 6/2001 | Ala-Laurila | |
| 6,249,808 B1 | 6/2001 | Seshadri | |
| 6,285,777 B2 | 9/2001 | Kanevsky et al. | |
| 6,304,636 B1 | 10/2001 | Goldberg et al. | |
| 6,356,867 B1 | 3/2002 | Gabai et al. | |
| 6,363,414 B1 | 3/2002 | Nicholls et al. | |
| 6,366,651 B1 | 4/2002 | Griffith et al. | |
| 6,389,276 B1 | 5/2002 | Brilla et al. | |
| 6,400,272 B1 | 6/2002 | Holtzman et al. | |
| 6,411,685 B1 | 6/2002 | O'Neal | |
| 6,477,492 B1 | 11/2002 | Connor | |
| 6,526,335 B1 | 2/2003 | Treyz et al. | |
| 6,560,323 B2 | 5/2003 | Gainsboro | |
| 6,570,970 B2 | 5/2003 | Gruchala et al. | |
| 6,591,367 B1 | 7/2003 | Kobata et al. | |
| 6,603,838 B1 | 8/2003 | Brown et al. | |
| 6,606,648 B1 | 8/2003 | Mukundan et al. | |
| 6,611,583 B1 | 8/2003 | Gainsboro | |
| 6,639,977 B1 | 10/2003 | Swope et al. | |
| 6,665,378 B1 | 12/2003 | Spielman et al. | |
| 6,665,380 B1 | 12/2003 | Cree et al. | |
| 6,668,045 B1 | 12/2003 | Mow | |
| 6,681,114 B2 | 1/2004 | Chang et al. | |
| 6,684,248 B1 | 1/2004 | Janacek et al. | |
| 6,714,982 B1 | 3/2004 | McDonough et al. | |
| 6,775,359 B1 | 8/2004 | Ron et al. | |
| 6,788,771 B2 | 9/2004 | Manto | |
| 6,801,932 B1 | 10/2004 | Picoult et al. | |
| 6,819,932 B2 | 11/2004 | Allison et al. | |
| 6,850,147 B2 | 2/2005 | Prokoski et al. | |
| 6,857,024 B1 | 2/2005 | Chen et al. | |
| 6,865,260 B1 | 3/2005 | Meadows et al. | |
| 6,879,677 B2 | 4/2005 | Trandal et al. | |
| 6,950,502 B1 | 9/2005 | Jenkins | |
| 7,003,308 B1 | 2/2006 | Fuoss et al. | |
| 7,013,002 B2 | 3/2006 | Link et al. | |
| 7,039,071 B2 | 5/2006 | Pekonen | |
| 7,039,171 B2 | 5/2006 | Gickler | |
| 7,039,949 B2 | 5/2006 | Cartmell et al. | |
| 7,046,779 B2 | 5/2006 | Hesse | |
| 7,058,163 B1 | 6/2006 | Parekh et al. | |
| 7,079,636 B1 | 7/2006 | McNitt et al. | |
| 7,085,359 B2 | 8/2006 | Crites et al. | |
| 7,095,829 B2 | 8/2006 | Claudatos et al. | |
| 7,106,843 B1 | 9/2006 | Gainsboro et al. | |
| 7,136,462 B2 | 11/2006 | Pelaez et al. | |
| 7,158,621 B2 | 1/2007 | Bayne | |
| 7,197,560 B2 | 3/2007 | Caslin et al. | |
| 7,248,680 B1 | 7/2007 | Gainsboro | |
| 7,256,816 B2 | 8/2007 | Profanchik et al. | |
| 7,260,383 B1 | 8/2007 | Ngan | |
| 7,265,853 B1 | 9/2007 | Kara et al. | |
| 7,277,695 B2 | 10/2007 | Petry et al. | |
| 7,278,028 B1 | 10/2007 | Hingoranee | |
| 7,333,798 B2 | 2/2008 | Hodge | |
| 7,359,494 B2 | 4/2008 | Leonard | |
| 7,363,302 B2 | 4/2008 | Lester | |
| 7,496,345 B1 | 2/2009 | Rae et al. | |
| 7,505,406 B1 | 3/2009 | Spadaro et al. | |
| 7,519,076 B2 | 4/2009 | Janssen et al. | |
| 7,551,732 B2 | 6/2009 | Anders | |
| 7,561,679 B1 | 7/2009 | Kalbag | |
| 7,561,680 B1 | 7/2009 | Falcone et al. | |
| 7,565,687 B2 | 7/2009 | Noguchi et al. | |
| 7,583,974 B2 | 9/2009 | Benco et al. | |
| 7,651,680 B2 | 1/2010 | Breton et al. | |
| 7,673,058 B1 | 3/2010 | White et al. | |
| 7,681,032 B2 | 3/2010 | Peled et al. | |
| 7,742,581 B2 | 6/2010 | Hodge et al. | |
| 7,742,582 B2 | 6/2010 | Harper | |
| 7,783,021 B2 | 8/2010 | Hodge | |
| 7,804,941 B2 | 9/2010 | Keiser et al. | |
| 7,881,446 B1 | 2/2011 | Apple et al. | |
| 7,899,167 B1 | 3/2011 | Rae | |
| 8,000,269 B1 | 8/2011 | Rae et al. | |
| 8,014,800 B2 | 9/2011 | Törnkvist | |
| 8,130,919 B2 | 3/2012 | Kalbag | |
| 8,204,177 B2 | 6/2012 | Harper | |
| 8,218,736 B1 | 7/2012 | McClintock et al. | |
| 8,232,862 B2 | 7/2012 | Lowe | |
| 8,238,534 B2 | 8/2012 | Link et al. | |
| 8,243,891 B2 | 8/2012 | Hodge et al. | |
| 8,255,300 B2 | 8/2012 | Polozola et al. | |
| 8,458,732 B2 | 6/2013 | Hanna et al. | |
| 8,488,756 B2 | 7/2013 | Hodge et al. | |
| 8,509,390 B2 | 8/2013 | Harper | |
| 8,515,031 B2 | 8/2013 | Hodge et al. | |
| 8,577,003 B2 | 11/2013 | Rae | |
| 8,626,118 B2 | 1/2014 | Smith et al. | |
| 8,725,115 B2 | 5/2014 | Liu et al. | |
| 8,838,622 B2 | 9/2014 | Irving et al. | |
| 9,043,813 B2 | 5/2015 | Hanna et al. | |
| 9,077,680 B2 | 7/2015 | Harper | |
| 9,282,188 B2 | 3/2016 | Hodge et al. | |
| 9,306,883 B2 | 4/2016 | Hodge et al. | |
| 9,621,714 B2 | 4/2017 | Seyfetdinov | |
| 9,667,663 B2 | 5/2017 | Hodge et al. | |
| 9,680,878 B2 | 6/2017 | Hodge et al. | |

(56) References Cited

U.S. PATENT DOCUMENTS

| | | | |
|---|---|---|---|
| 9,680,879 B2 | 6/2017 | Hodge et al. | |
| 9,692,718 B2* | 6/2017 | Bennett | H04L 51/12 |
| 9,757,032 B2 | 9/2017 | Gross et al. | |
| 9,787,724 B2 | 10/2017 | Hodge et al. | |
| 9,807,123 B2 | 10/2017 | Hodge et al. | |
| 9,871,915 B2 | 1/2018 | Hodge et al. | |
| 9,876,915 B2 | 1/2018 | Hodge et al. | |
| 9,923,932 B2 | 3/2018 | Hodge et al. | |
| 9,967,291 B1* | 5/2018 | Hodge | H04L 51/066 |
| 10,116,707 B2 | 10/2018 | Hodge et al. | |
| 10,218,842 B2 | 2/2019 | Hodge et al. | |
| 2001/0036821 A1 | 11/2001 | Gainsboro et al. | |
| 2002/0007453 A1 | 1/2002 | Nemovicher | |
| 2002/0054674 A1 | 5/2002 | Chang et al. | |
| 2002/0071537 A1 | 6/2002 | Gainsboro | |
| 2002/0111887 A1 | 8/2002 | McFarlane et al. | |
| 2002/0159600 A1 | 10/2002 | Weiner | |
| 2002/0183040 A1 | 12/2002 | Lundstrom et al. | |
| 2003/0002639 A1 | 1/2003 | Huie | |
| 2003/0009333 A1 | 1/2003 | Sharma et al. | |
| 2003/0070076 A1 | 4/2003 | Michael | |
| 2003/0083041 A1 | 5/2003 | Kumar et al. | |
| 2003/0086546 A1 | 5/2003 | Falcone et al. | |
| 2003/0126470 A1 | 7/2003 | Crites et al. | |
| 2003/0187939 A1 | 10/2003 | O'Brien | |
| 2003/0198325 A1 | 10/2003 | Bayne | |
| 2003/0200078 A1 | 10/2003 | Luo et al. | |
| 2003/0216983 A1 | 11/2003 | Bodin | |
| 2004/0029564 A1 | 2/2004 | Hodge | |
| 2004/0058667 A1 | 3/2004 | Pienmaki et al. | |
| 2004/0076272 A1 | 4/2004 | Zafar et al. | |
| 2004/0081296 A1 | 4/2004 | Brown et al. | |
| 2004/0120475 A1 | 6/2004 | Bauer et al. | |
| 2004/0202327 A1* | 10/2004 | Little | H04L 9/3247 380/270 |
| 2004/0236838 A1 | 11/2004 | Tout | |
| 2004/0252447 A1 | 12/2004 | Hesse et al. | |
| 2005/0010573 A1 | 1/2005 | Garg | |
| 2005/0055411 A1 | 3/2005 | Bouchard | |
| 2005/0078612 A1 | 4/2005 | Lang | |
| 2005/0080868 A1 | 4/2005 | Malik | |
| 2005/0094794 A1 | 5/2005 | Creamer et al. | |
| 2005/0114192 A1 | 5/2005 | Tor et al. | |
| 2005/0125226 A1 | 6/2005 | Magee | |
| 2005/0207341 A1 | 9/2005 | Zhang | |
| 2005/0265322 A1 | 12/2005 | Hester | |
| 2005/0286498 A1 | 12/2005 | Rand et al. | |
| 2005/0287993 A1 | 12/2005 | Gogic | |
| 2006/0062355 A1 | 3/2006 | Leonard | |
| 2006/0087554 A1 | 4/2006 | Boyd et al. | |
| 2006/0098796 A1 | 5/2006 | Link | |
| 2006/0149644 A1 | 7/2006 | Sulmar et al. | |
| 2006/0168015 A1 | 7/2006 | Fowler | |
| 2006/0245552 A1 | 11/2006 | Hayashi | |
| 2006/0245559 A1 | 11/2006 | Hodge et al. | |
| 2007/0041545 A1 | 2/2007 | Gainsboro | |
| 2007/0044734 A1 | 3/2007 | Maloney et al. | |
| 2007/0155411 A1 | 7/2007 | Morrison | |
| 2007/0165790 A1 | 7/2007 | Taori et al. | |
| 2007/0207785 A1 | 9/2007 | Chatterjee et al. | |
| 2007/0233610 A1 | 10/2007 | Gyllenskog et al. | |
| 2007/0239898 A1 | 10/2007 | Friend et al. | |
| 2007/0263853 A1 | 11/2007 | Pearson et al. | |
| 2007/0283006 A1 | 12/2007 | Hong | |
| 2008/0037722 A1 | 2/2008 | Klassen | |
| 2008/0126951 A1 | 5/2008 | Sood et al. | |
| 2008/0200152 A1 | 8/2008 | Moore | |
| 2008/0219414 A1 | 9/2008 | Ramamoorthy et al. | |
| 2009/0054031 A1 | 2/2009 | Smith et al. | |
| 2009/0086631 A1 | 4/2009 | Jayapalan et al. | |
| 2009/0086936 A1 | 4/2009 | Clifford et al. | |
| 2009/0197622 A1 | 8/2009 | Atarius | |
| 2009/0201886 A1 | 8/2009 | Lee et al. | |
| 2009/0274279 A1 | 11/2009 | Reynolds | |
| 2010/0023472 A1 | 1/2010 | Loeb | |
| 2010/0054433 A1 | 3/2010 | Gustave et al. | |
| 2010/0056110 A1 | 3/2010 | Liu et al. | |
| 2010/0138357 A1 | 6/2010 | Mufti-Bey | |
| 2010/0189228 A1 | 7/2010 | Seyfetdinov | |
| 2010/0254263 A1 | 10/2010 | Chen et al. | |
| 2010/0299761 A1 | 11/2010 | Shapiro | |
| 2010/0318441 A1 | 12/2010 | Harper | |
| 2011/0106894 A1 | 5/2011 | Hodge et al. | |
| 2011/0286585 A1 | 11/2011 | Hodge | |
| 2011/0286591 A1 | 11/2011 | Fulton et al. | |
| 2012/0094680 A1 | 4/2012 | Stackelius et al. | |
| 2012/0202454 A1 | 8/2012 | Smith et al. | |
| 2013/0058274 A1 | 3/2013 | Scherzer et al. | |
| 2013/0162423 A1 | 6/2013 | Rowe et al. | |
| 2013/0179949 A1 | 7/2013 | Shapiro | |
| 2013/0246535 A1 | 9/2013 | Yadava et al. | |
| 2014/0020063 A1 | 1/2014 | Hodge et al. | |
| 2014/0044242 A1 | 2/2014 | Hodge et al. | |
| 2014/0280631 A1* | 9/2014 | Torgersrud | H04L 51/34 709/206 |
| 2015/0043721 A1 | 2/2015 | Hodge et al. | |
| 2015/0046978 A1 | 2/2015 | Hodge et al. | |
| 2015/0047004 A1 | 2/2015 | Hodge et al. | |
| 2015/0066523 A1 | 3/2015 | Pan | |
| 2015/0103990 A1 | 4/2015 | Lee | |
| 2015/0201080 A1 | 7/2015 | Hodge et al. | |
| 2015/0201081 A1 | 7/2015 | Hodge et al. | |
| 2015/0215254 A1* | 7/2015 | Bennett | H04L 51/12 709/206 |
| 2015/0223705 A1 | 8/2015 | Sadhu | |
| 2016/0142537 A1 | 5/2016 | Hodge et al. | |
| 2016/0156625 A1 | 6/2016 | Hodge et al. | |
| 2016/0381082 A1 | 12/2016 | Hodge et al. | |
| 2017/0127257 A1 | 5/2017 | Saxena et al. | |
| 2017/0142258 A1 | 5/2017 | Seyfetdinov | |
| 2017/0279857 A1 | 9/2017 | Hodge et al. | |
| 2017/0302756 A1* | 10/2017 | Chou | H04L 67/2852 |
| 2017/0324834 A1 | 11/2017 | Hodge | |
| 2018/0213090 A1 | 7/2018 | Hodge et al. | |

FOREIGN PATENT DOCUMENTS

| | | |
|---|---|---|
| WO | WO 99/21330 A1 | 4/1999 |
| WO | WO 99/48054 A1 | 9/1999 |

OTHER PUBLICATIONS

"Cisco IAD2400 Series Business-Class Integrated Access Device," Cisco Systems Datasheet, 2003.

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

"Criminal Calls: A Review of the Bureau of Prisons' Management of Inmate Telephone Privileges," U.S. Department of Justice, Office of the Inspector General, Aug. 1999.

"Why Can't You Make a Collect Call to a Cell Phone," National Public Radio, Jun. 30, 2008, Accessed via http://www.npr.org/templates/story/story.php?storyId=92021561 on Apr. 6, 2015.

1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.

1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.

Advanced Technologies Group, Inc, White Paper: Introduction to Advanced Technologies Group, Inc., Inmate Correspondence System, Aug. 5, 2002, American Corrections Association Annual Conference, Anaheim, California.

Advanced Technologies Group, Inc., Correspondence System Poster, published Jul. 29, 2002 by Exhibit-Resources Midwest, displayed at Aug. 2002 American Corrections Association Annual Conference, Anaheim, California.

(56) References Cited

OTHER PUBLICATIONS

Advanced Technologies Group, Inc., Offender Management Suite: Correspondence System Brochure, printing invoice dated Aug. 2, 2002, brochure distributed at Aug. 2002 American Corrections Association Annual Conference, Anaheim, California.
Ahimovic et al., "Services for Tomorrow's PCS," IEEE International Conference on Universal Personal Communications, vol. 1, Oct. 12-15, 1993; pp. 222-227.
Assignment of U.S. Pat. No. 8,190,121 and U.S. Appl. No. 13/449,308.
Avtalion, J., "Keeping tabs on call centres," Telecommunications, vol. 31, No. 7, Jul. 1997, pp. 70-72.
Brown, et al., "SMS: The Short Message Service," Computer, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.
Creps, et al., "Is somebody watching? Employee communications and privacy," Risk Management vol. 44, No. 4, Apr. 1997, pp. 22-28.
Definition of "telephony", McGraw-Hill Dictionary of Scientific and Technical Terms, 6th Edition (McGraw-Hill, 2003).
Definitions of "Local Area Network (LAN)" and "Wide Area Network (WAN)," Microsoft Computer Dictionary (Microsoft Press 2002), pp. 304 and 561.
Digital Copy of "Bellcore Notes on the Networks," Bellcore, Special Report SR-2275, Issue 3, Dec. 1997.
English-language Abstract for European Patent Publication No. 0989720 A1; 2 pages.
Excerpts from U.S. Appl. No. 60/538,933 to Shapiro, filed Jan. 22, 2004, 7 pages.
Excerpts from the Prosecution History of U.S. Appl. No. 10/135,878, filed Apr. 29, 2002.
File History of U.S. Pat. No. 7,899,167, U.S. Appl. No. 10/642,532, filed Aug. 15, 2003.
File History of U.S. Pat. No. 8,190,121, U.S. Appl. No. 12/103,138, filed Apr. 15, 2008.
File History of U.S. Pat. No. 8,515,031, U.S. Appl. No. 13/584,295, filed Aug. 13, 2012.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
Reexamination Application No. 90/012,802 of U.S. Pat. No. 8,190,121, filed Mar. 1, 2013.
Garner, et al., "Mobile Terminated SMS Billing—Exploits and Security Analysis," IEEE International Conference on Information Technology: New Generations, 2006.
Henry, M., "Unethical staff behavior," Corrections Today, vol. 60, No. 3, Jun. 1, 1998.
International Search Report and Written Opinion directed to International Patent Application No. PCT/US2016/018653, dated May 30, 2016; 11 pages.
International Search Report and Written Opinion directed to International Patent Application No. PCT/US2017/031321, dated Jul. 14, 2017; 13 pages.
Jeff Hewett and Lee Dryburgh, Signaling System No. 7 (SS7/C7): Protocol, Architecture, and Services (Networking Technology) at 85 (Cisco Press, Jun. 2005).
Joint Claim Construction and Prehearing Statement, Exhibit B: Securus' Intrinsic and Extrinsic Evidence Charts, *Global Tel\*Link Corporation v. Securus Technologies, Inc.*, No. 3:14-cv-00829-K (N.D. Tex.), Sep. 26, 2014.

Maghan, J., "Intelligence Gathering Approaches in Prisons," Low Intensity Conflict & Law Enforcement, vol. 3. No. 3, 1994, pp. 548-557.
McKitterick et al., "State of the Art Review of Mobile Payment Technology," Department of Computer Science, Trinity College Dublin; 22 pages.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Photocopy of "Bellcore Notes on the Networks (Formerly BOC Notes on the LEC Networks)," Bellcore, Special Report SR-2275, Issue 3, Dec. 1997.
Procops, T., "Advanced call logging for public safety organizations," Public Management, vol. 82, vol. 3, Mar. 2000, pp. 17-19.
Prosecution History of U.S. Appl. No. 11/045,589, filed Jan. 28, 2005.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearer, G., "How logging and monitoring technologies improve quality in a call center," Telemarketing & Call Center Solutions, vol. 16, No. 7, Jan. 1998, pp. 92-101.
Smith, M., "Corrections Turns Over a New LEAF: Correctional Agencies Receive Assistance From the Law Enforcement Analysis Facility," Corrections Today, Oct. 1, 2001.
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 12/103,138, "System and Method for Authorizing and Monetizing Collect Cellular Telephone Calls," to Smith et al., filed Apr. 15, 2008.
U.S. Appl. No. 13/449,308, "System and Method for Authorizing and Monetizing Collect Cellular Telephone Calls," to Smith et al., filed Apr. 17, 2012.
U.S. Appl. No. 15/288,520, "Electronic Messaging Device," to Hodge et al., filed Oct. 7, 2016.
U.S. Appl. No. 60/036,689, filed Jan. 31, 1997, titled Database Origami.
U.S. Appl. No. 60/246,070, "Employee Online Activity Monitoring System," to Mcfarlane, et al., filed Nov. 7, 2000.
U.S. Appl. No. 60/500,725, "SMS Message Processing," to Claudatos, filed Sep. 4, 2003.
U.S. Appl. No. 60/607,447, "IP-based telephony system and method," to Apple, et al., filed Sep. 3, 2004.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

(56) References Cited

OTHER PUBLICATIONS

Valcourt, et al., "Investigating mobile payment: Supporting technologies, methods, and use," IEEE International Conference on Wireless and Mobile Computing, Networking, and Communications, 2005.

Web pages from "Electronic Message Solutions Inc. (EMS): Improving Relationships through faster Correspondence," 2004, 9 pages; retrieved from http://www.inmatemail.com.

Wenndt, et al., "Content recognition for telephone monitoring," Proceedings of the SPIE—The International Society for Optical Engineering, vol. 4232, 2001, pp. 274-280.

Wireless Interconnection and Reciprocal Compensation Agreement Between Community Telephone Company and United States Cellular Corporation, Apr. 24, 2006; 29 pages.

\* cited by examiner

Database 400

| | | | COMM 1 | COMM 2 |
|---|---|---|---|---|
| | | | AWD Address 1 | psmith@facility1.com |
| Facility 1 | Block 1 | Peter Smith | Voice Message Box | Bulletin |
| Facility 1 | Block 1 | John White | | |
| Facility 1 | Block 1 | 3 | | |
| Facility 1 | Block 2 | 1 | | |
| Facility 1 | Block 2 | 2 | | |
| Facility 2 | Block 1 | 1 | | |
| Facility 2 | Block 1 | 2 | | |
| Facility 2 | Block 1 | 3 | | |
| Facility 2 | Block 1 | 4 | | |
| Facility 2 | Block 2 | 1 | | |
| Facility 2 | Block 2 | 2 | | |
| Facility 2 | Block 3 | 1 | | |
| Facility 2 | Block 3 | 2 | | |
| Facility 3 | Block 1 | 1 | | |
| Facility 3 | Block 1 | 2 | | |
| Facility 3 | Block 1 | 3 | | |
| Facility 3 | Block 1 | 4 | | |
| Facility 3 | Block 2 | 1 | | |
| Facility 3 | Block 2 | 2 | | |
| Facility 3 | Block 2 | 3 | | |
| Facility 3 | Block 2 | 4 | | |

FIG. 4

SYSTEM AND METHOD FOR INMATE NOTIFICATION AND TRAINING IN A CONTROLLED ENVIRONMENT FACILITY

BACKGROUND

Field

This disclosure relates to disseminating information, such as notifications and announcements to inmates of a controlled environment facility.

Background

Inmates of prisons or other controlled environment facilities live under very controlled conditions, and their access to information from both inside and outside the prison is often limited. However, many situations arise in which prison officials desire to disseminate certain information to the inmates. As of currently, that information is passed along in rather inconvenient and inaccurate ways, such as word of mouth or PA announcements.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

FIG. 4 illustrates an exemplary data table for use with the exemplary messaging center of FIG. 2, according to embodiments of the present disclosure.

Figure 1:
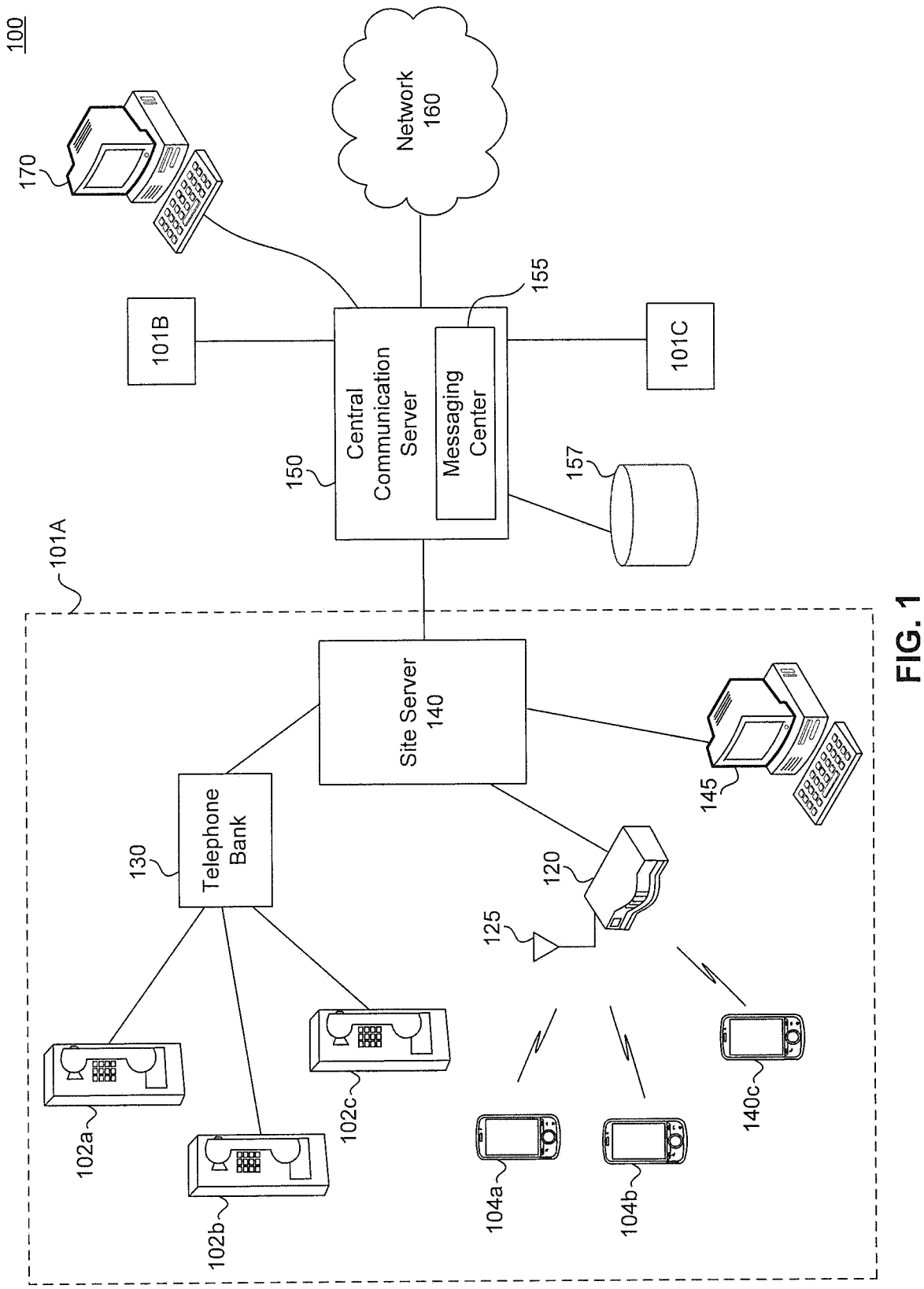
FIG. 1 illustrates a block diagram of an exemplary controlled environment communication system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

As discussed above, there are currently insufficient means of disseminating information to inmates within controlled facilities. This is partially due to the traditional communications limitations within prison facilities. Because of substantial security concerns, inmates of such facilities were traditionally limited to placing calls at highly-monitored central telephone banks in the facility, and their access to the Internet was completely prohibited. However, recent technological advancements have allowed for inmates of secure facilities to be assigned wireless communication devices, such as that described in U.S. patent application Ser. No. 13/946,637, entitled Multifunction Wireless Device, the entirety of which is incorporated herein by reference.

With the advent of these new communication capabilities, controlled environment facilities have significant new communications lines available between administrators and the inmates. Thus, it is conceived that those devices be used as a means for facilitating better and more direct communication with inmates for purposes of information dissemination. Systems and methods for carrying out these objections will be described herein for carrying out those objectives.

Exemplary Communication System

FIG. 1 illustrates a block diagram of an exemplary controlled environment communication system 100, according to embodiments of the present disclosure. The communication system includes a central communication server 150 connected to a plurality of different controlled environment facilities 101. The central communication server 150 performs the call and other communications data processing for the different facilities, including routing and monitoring calls, Internet activity, and video calling, etc. In an embodiment, the central communication server 150 is centrally located from the multiple controlled environment facilities. In another embodiment, the central communication server 150 is located on site at one of the controlled environment facilities 101. The central communication server 150 also includes a messaging center 155 for processing incoming and outgoing messages or other notifications to the inmate population.

In an embodiment, an exemplary controlled environment facility includes a site server 140 that handles internal call processing and routing. In an alternative embodiment, the site server 140 is located remotely from the facility, such as within the central communication server 150. Such processing primarily includes routing call data from the central communication server 150 to its respective destination telephone device. A telephone bank 130 and a router 120 are in communication with the site server 140 for receiving call data from the site server 140. The telephone bank 130 serves a plurality of hardwired telephones 102. These phones may be VoIP, POTS, or other telephone devices capable of communication with the site server 140 over a telephone or data communication line. Meanwhile, the router 120 includes one or more antenna 125 for wirelessly communicating with one or more wireless communication devices 104 assigned to the different inmates and/or prison personnel associated with the facility. An on-site administrative terminal 145 is also connected to the site server to allow for an authorized individual to send a notification or other message, and/or access the central communication server 150.

Multiple other controlled environment facilities 101 are connected to the central communication server 150. Those facilities 101 may have the same or similar configurations to the exemplary controlled environment facility 101A. Also connected with the central communication server 150 is an administrative terminal 170, a database 157, and a network 160. In an embodiment, the administrative terminal 170 is an on-site computer terminal, accessible by an authorized administrator, and with control capabilities of the central communication server 150. In an embodiment, the database 157 is a separate database located remotely from the central communication server 150, and stores numerous different types of call and administrative data relating to one or more of the controlled environment facilities 101. In an embodiment, the network 160 is a public network for communicating across telephone or other communication lines to outside parties, such as the public switched telephone network (PSTN).

In operation, a pre-registered individual attempts to access the messaging center 155 via either the on-site administrative terminal 145 or the administrative terminal 170. If the individual has not yet been registered, the individual must undergo a registration process to register certain identifying information of the individual along with authentication information, such as a PIN or biometric sample associated with the individual. The registration information is stored in the database 157 along with messaging permissions. At some point before the individual submits a message, the individual is prompted to identify themselves, after which an authentication of the individual occurs. The individual may identify themselves using a PIN or a biometric submission, such as a fingerprint, voice sample, facial scan, etc. The administrative terminal 145/170 forwards the received information to the central communication server 150 for authentication.

The central communication server 150 uses the received identifying information to locate a user record in the database with matching identifying information. Once retrieved, biometric authentication is performed by performing a statistical comparison of the received biometric identification to the previously-stored biometric information. Based on the comparison, the central communication server 150 authenticates the individual. After the user has been authenticated, the central communication server 150 returns a notification to the corresponding terminal that the individual has been authenticated along with the individual's messaging permissions based on the retrieved user record. Summarily, the messaging permissions identify whether the individual is permitted to submit messages with or without approval, and for which inmates.

After the user has been authenticated, the user submits a message via an interface associated with the corresponding administrative terminal 145/170 along with an identification of recipient inmates. In an embodiment, the recipient inmates are identified as a group, such as by location or status. The terminal 145/170 transmits the message and recipient information to the central communication server 150, where it is received by the messaging center 155. The messaging center 155 processes the received recipient information and transmits the received message over the various communication lines to the identified recipients. Further details regarding the message processing and transmission is described below.

Exemplary Messaging Center

Figure 2:
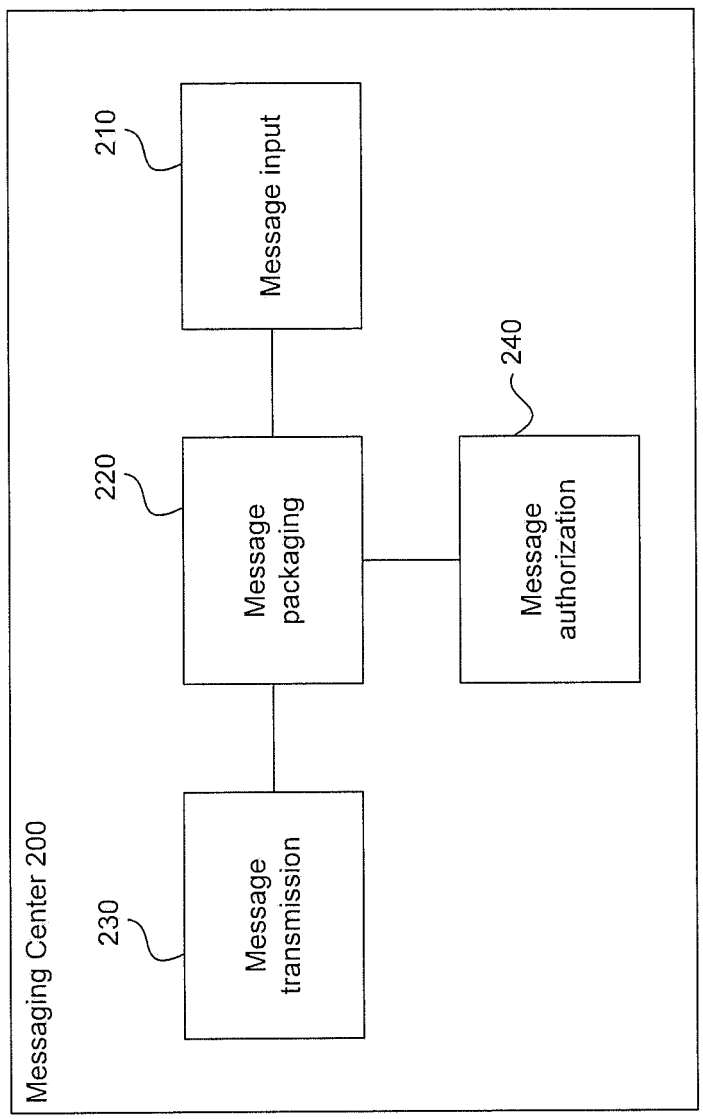
FIG. 2 illustrates a block diagram of an exemplary messaging center of the exemplary controlled environment communication system of FIG. 1, according to embodiments of the present disclosure.

FIG. 2 illustrates a block diagram of an exemplary messaging center 200 of the exemplary controlled environment communication system 100 of FIG. 1, according to embodiments of the present disclosure. The messaging center 200 includes message input 210, message packaging 220, message transmitter 230, and message authorization 240, and may represent an exemplary embodiment of the messaging center 150, illustrated in FIG. 1.

In an embodiment, the messaging center 200 receives the message from the user at message input 210. As discussed above, the message is received from the user via one of the administrative terminals 145/170, through the central communication system 150. In another embodiment, the user sends the message information from a separate device, such as a personal wireless device or personal computer workstation. At the message input 210 of the messaging center 200, the message is received with all necessary information for proper delivery, including the message itself as well as intended recipient information, such as inmate group, facility, district, etc.

The message input 210 forwards the received information to the message packaging 220. Message packaging 220 reviews the destination information received with the message and accesses a database to review transmission protocols for the intended destination. For example, many facilities may have specific transfer protocols, message formats, etc. These protocols are stored in the message packaging 220, or in database 157 accessed by the message packaging 220. After the message protocols are retrieved by the message packaging 220, message packaging formats the relevant information into the appropriate format dictated by the retrieved format information for transmission. To provide an example, a particular facility may provide a certain number of leading bits in the message for the inmate designation, and may also designate how different inmate groups are to be referenced within the encoded message. Based on the this information, message packing assigns the relevant inmate group code based on the destination information within the message, and then organizes the destination information and the message information into the final encoded message for transmission.

In an embodiment, message packaging 220 also utilizes the user information received in the received message to determine permissions. In other words, using the user information associated with the received message, message packaging 220 checks the database 157 to determine the permission level associated with the user. Certain users are granted different messaging permissions. In an embodiment, there are three levels of permissions, including full, limited, and none. Full permissions allow for messages to be transmitted without review or authorization, limited permissions allow for messages to be transmitted after authorization from a registered user with full permissions to the destination, and those with no permissions are prohibited from sending messages to the destination. For example, the warden of a particular facility is granted full permissions for that facility, but limited permissions for all other facilities within the district, and no permissions for other facilities in the state. Meanwhile, an administrator with the state department of corrections may be provided full permissions for all facilities in the state. In embodiments, the permissions are broken down by inmate groups within facilities, or even individual inmates within facilities.

If the message packaging 220 determines from the user information and the permissions data retrieved from the database that the user has no permissions to the destination information included in the received message information, the message packaging denies transmission of the message. If the message packaging 220 determines that the user has full permissions, the message packaging 220 packages the message for transmission to the destination. If the message packaging 220 determines that the user has limited permissions, message packaging controls message authorization 240 to contact a pre-designated authorized person to authorize the message. The message authorization 240 returns a "authorized" or "not authorized". If the message authorization 240 returns "authorized", the message packaging 220 proceeds to package and forward the message for transmission. On the other hand, if the message authorization 240 returns "not authorized," message packaging declines to send the message.

The message transmitter 230 receives the packaged message from message packaging 220, and then transmits the packaged message to the relevant facility designated in the message. In an embodiment, the facility is designated in the packaged message by an IP address or other network address.

Site Server

Figure 3:
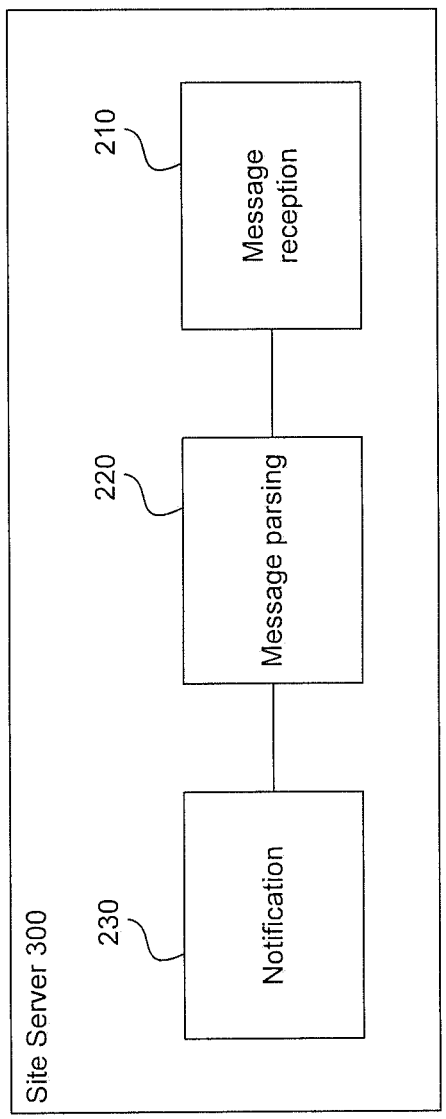
FIG. 3 illustrates a block diagram of an exemplary site server for use in the exemplary controlled environment communication system of FIG. 1, according to embodiments of the present disclosure.

FIG. 3 illustrates an exemplary site server 300 according to an embodiment. The site server 300 includes a message receiver 310, message parsing 320, and notification 330, and may represent an exemplary embodiment of the site server 140 of FIG. 1.

As discussed above, each facility may have its own message formatting requirements. Regardless, there is more information than simply the message, which is received by the site server 300. Namely, the received message includes the message, as well as recipient information, message sender, etc. Additional examples of information that can be included in a received message package is delivery time, permissions, etc. All this information is packaged together into the format designated by the facility, and transmitted to the facility by the central communication server 140.

The packaged message is received at the site server 300 by the message receiver 310. The message receiver 310 forwards the received message package to the message parsing 320. The message parsing utilizes the predetermined message format associated with the facility to parse out the different informational portions of the received message. For example, the message parsing 320 extracts the message, the recipient information, and any other portions of the message package included therein.

Once all relevant elemental portions of the message have been extracted, the notification 330 proceeds to carry out message delivery. For example, at a minimum, the notification 330 retrieves the recipient information and the message, and forwards the message to all of the recipients identified. In an embodiment, the recipients are identified individually. In another embodiment, the recipients are identified as part of a group, such as a particular cell block, wing, or facility.

In an embodiment, delivery methods for each inmate are stored in a database located within the facility 101A, such as within site server 140. In this embodiment, when carrying out the deliver process, the notification 330 accesses the database and retrieved delivery methods for each recipient. Such delivery methods may include SMS or MMS message, email, PA announcement, or digital bulletin board, among others. The delivery method selected for each recipient may depend on the recipients available communication methods. For example, an inmate with an assigned wireless communication device will have SMS or MMS delivery methods selected, whereas an inmate without such a device will be limited to email (if he/she has such access), or PA/bulletin.

As discussed above, the notification 330 may also adjust the notification procedure based on the other data fields included in the message package. For example, if the message package includes a delivery time, the notification 330 will wait to transmit the message until the designated time. Other modifications are available based on other data fields in the message package.

In the manner described above, facilities are capable of receiving and disseminating messages to designated individuals housed therein.

FIG. 4 illustrates an exemplary data table for use with the exemplary messaging center of FIG. 2, according to embodiments of the present disclosure. The table includes numerous information useful for the dissemination of information to inmates. The database is organized according to facility, as shown in the first column 410. Each facility can be further broken down into smaller subsections of residents, such as cell blocks (shown in second column 420). There may be multiple, or different, subsections than that depicted, including wing, security level, responsible security officer, etc. Regardless of which, or how many, subsets are included in the database, each inmate is identified in correspondence with his/her relevant data points, such as shown in the third column 430. In the example shown in FIG. 4, inmate Peter Smith is a resident of Facility 1, Cell Block 1. In an embodiment, all inmates of the facility that are capable of receiving notifications via the notification system are identified in this database with their respective location information.

In addition to location and identification information, the database also includes delivery information. The delivery information should include at least a primary notification means, such as shown in the fourth column 440. In an embodiment, secondary or more notification means are also included, such as shown in the fifth column 450. The notification means shown in the fourth and fifth columns include a destination address for the inmate, where such an address exists, and a general notification description where no such address exists. For the example shown in FIG. 4, inmate peter smith should primarily be notified via his assigned wireless device at the device address: "AWD Address 1." In an embodiment, the address of the assigned wireless device can be in the form of IP address, device identification, MAC address, etc. Secondarily, Peter Smith is to be notified via email at the address: "psmith@facility1.com." In each of these communication methods, an address exists and is so identified in the database.

In a second example of FIG. 4, a second inmate of facility 1, John White, is primarily to be notified via his voice message box. For such a notification, no address is necessary because the central communication server 150 maintains a voice message box for each inmate through which he can send and receive messages with outsiders. Typically, upon next accessing the telecommunication system (or via other means), the inmate will receive notification of a pending message, upon which he can login to the system and retrieve his message. Secondarily, inmate John White is to be notified via bulletin, which requires that the message be posted somewhere publicly where he is likely to see the message. In an embodiment, the system 100 includes an electronic bulletin connected with the central communication server, that is configured to be updated with new notification information from the messaging 200 for publishing.

In the above embodiment, all the described data elements are included in a single database that is accessible by, and/or managed by, the central communication server 150. However, in another embodiment, it may be beneficial to maintain the delivery information at the facility, since that is where that information becomes relevant. In the former embodiment, the delivery information is packaged with the message information in the transmitted message, whereas in the latter embodiment, the delivery information can be omitted from the packaged message and determined at the site based on the identified recipients/groups. By maintaining a relational database of the inmates and all their relevant groups, the system is able to efficiently parse messages to all intended recipients without requiring a full list of those recipients. In an embodiment, the system also allows for the user to input an omission, such as a person of the identified delivery group to which the message will not be sent.

Figure 5:
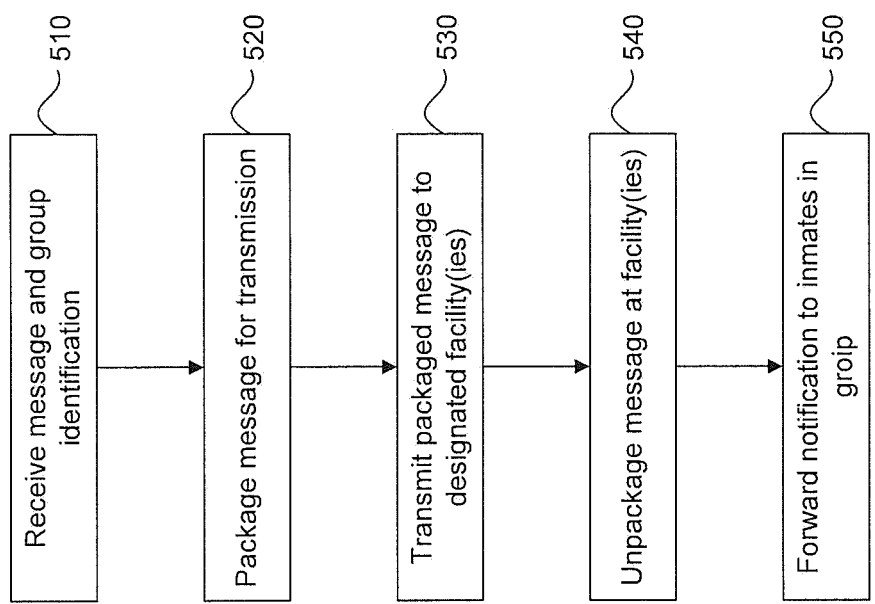
FIG. 5 illustrates a flowchart diagram of an exemplary method for disseminating a notification to one or more inmates of a controlled environment facility.

FIG. 5 illustrates a flowchart diagram of an exemplary method for generating and transmitting messages to inmates. In the embodiment, the system receives a message and a recipient identification from the user (510). In an embodiment, the recipient is a group of inmates at one or more facilities, which are identified by their group rather than individually. After the relevant information has been received, the system packages the message (520) together with all relevant delivery information, such as group identification, omission information, delivery time, and authorization status of the sender. In an embodiment, the packaging may also include an encoding scheme unique to the destination prison, if applicable.

Once packaged, the packaged message is transmitted to the one or more facilities that include recipient inmates (530). If the designated recipient group is limited to inmates of a single facility, then the message is transmitted only to that facility. On the other hand, if the designated recipient group includes inmates of multiple facilities, then the packaged message is sent to all of those facilities. In this latter scenario, if facility-specific encoding is required, a separate packaged message can be generated for each facility that has a different encoding scheme in that encoding scheme.

Once the message is received by the facility, the facility unpacks the packaged message using its encoding scheme (540). As a result of the unpacking of the message, the different portions of the packaged message are extracted and parsed. The facility-based delivery system analyzes the parsed information in order to determine when, how, and to whom the extracted message is to be delivered. The facility-based system then delivers the message in accordance with that determination (550).

As has been described above, the system for delivering messages includes two separate messaging systems, one centralized to receive a message, and forward relevant messaging information to designated facilities, and a second that is located on-site at a facility (or off-site, but which serves the facility) to handle final delivery responsibilities of the received message within the facility. However, in an embodiment, these two messaging system can be combined into a single system that has communication privileges within the facility for carrying out final delivery responsibilities.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
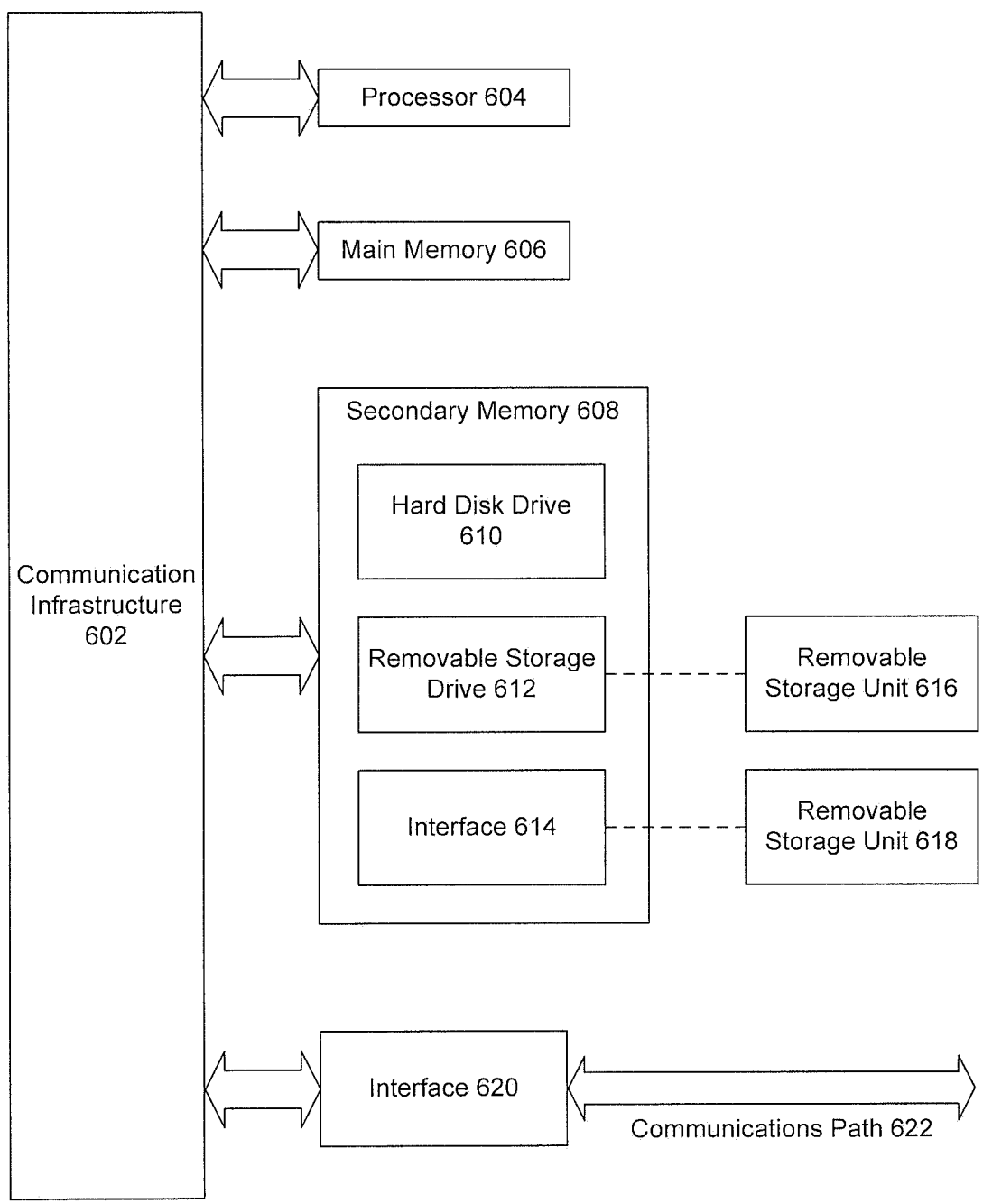
FIG. 6 illustrates a block diagram of computer system.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIG. 5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A central communication system, the central communication system being in communication with an administrative terminal and providing communication services to a controlled-environment facility, the central communication system comprising:
 a database configured to store messaging permission data and a message packaging scheme of the controlled-environment facility, the message packaging scheme dictating an encoding format of a message transmitted to the controlled-environment facility to allow for the message to be successfully decoded by the controlled-environment facility, the encoding format being associated with the controlled-environment facility and including a number of leading bits for identifying an inmate and defining a number of inmate groups and their respective codes;
 a messaging center that includes one or more processors and/or circuits configured to:
  receive messaging data from a user of the administrative terminal, the messaging data including a message and an identification of a recipient group;
  retrieve the message packaging scheme based on the recipient group;
  encode the message according to the retrieved message packaging scheme; and
  transmit the encoded message to the facility.

2. The central communication system of claim 1, wherein messaging data further includes identification data of the user, the one or more processors and/or circuits of the messaging center being further configured to:
  retrieve the permission data from the database relating to the user based on the identification data;
  determine a permission level of the user based on the retrieved permission data.

3. The central communication system of claim 2, wherein the permission level is one of full, limited or none.

4. The central communication system of claim 3, the one or more processors and/or circuits of the message center being further configured to:
  contact a designated individual to request authorization of the message in response to the determining of the permission level determining that the user has limited permission.

5. The central communication system of claim 3, the one or more processors and/or circuits of the message center being further configured to:
  reject, and not transmit the message, in response to the determining of the permission level determining that the permission level is none.

6. The central communication system of claim 1, wherein the recipient group is a group of inmates of the controlled-environment facility, identified by a common trait.

7. The central communication system of claim 6, wherein the common trait is a location.

8. A method of transmitting notifications to inmates of a controlled-environment facility, the method comprising:
  receiving messaging information from an administrative terminal, the messaging information including personal identification information of a user that entered the messaging information at the administrative terminal, a message, and a recipient group;
  determining a packaging scheme associated with the controlled-environment facility, the packaging scheme being a set of rules that dictate placement and order of message data within an encoded message transmitted to the controlled-environment facility to allow for the message to be successfully decoded by the controlled-environment facility, the packaging scheme being associated with the controlled-environment facility and including a number of leading bits for identifying an inmate and defining a number of inmate groups and their respective codes;
  encoding the message data according to the determined packaging scheme; and
  transmitting the encoded message to the controlled-environment facility for distribution of the message.

9. The method of claim 8, further comprising determining a permission level of the user based on the personal identification information and the recipient group.

10. The method of claim 9, wherein the determining of the permission level determines whether the user is permitted to send the message and whether permission from an authorized person is required.

11. The method of claim 10, wherein, in response to determining that permission from an authorized person is required for sending the message, automatically transmitting the message, user identity and recipient group to the authorized person.

12. The method of claim 8, further comprising reviewing the message for objectionable content prior to transmitting the message.

13. The method of claim 12, further comprising withholding the message from transmission in response to detecting objectionable content.

14. A central communication system, the central communication system being in communication with an administrative terminal and providing communication services to a controlled-environment facility, the central communication system comprising:
  a messaging center that includes one or more processors and/or circuits configured to:
    receive messaging data from a user of the administrative terminal, the messaging data including a message and an identification of a recipient group;
    retrieve a message packaging scheme from a database based on the recipient group, the message packaging scheme dictating an encoding format of a message transmitted to the facility to allow for the message to be successfully decoded by the controlled-environment facility, the encoding format being associated with the controlled-environment facility and including a number of leading bits for identifying the user and defining a number of inmate groups and their respective codes;
    encode the message according to the retrieved packaging scheme; and
    transmit the encoded message to the facility.

15. The central communication system of claim 14, wherein the messaging data further includes identification data of the user.

16. The central communication system of claim 15, wherein the one or more processors and/or circuits of the messaging center are further configured to:
  retrieve permission data from the database relating to the user based on the identification data; and
  determine a permission level of the user based on the retrieved permission data.

17. The central communication system of claim 16, the one or more processors and/or circuits of the message center being further configured to:
  contact a designated individual; and
  request authorization from the designated individual of the message in response to the determining of the permission level indicating that the user has limited permission.

18. The central communication system of claim 16, the one or more processors and/or circuits of the message center being further configured to:
  reject, and not transmit the message, in response to the determining of the permission level indicating that the permission level is none.

19. The central communication system of claim 14, wherein the recipient group is a group of inmates of the controlled-environment facility, identified by a common trait.

20. The central communication system of claim 19, wherein the common trait is a location.

* * * * *